June 24, 1952 V. A. NAVIKAS 2,601,318
METHOD OF LAMINATING ARTICLES
Filed June 11, 1946
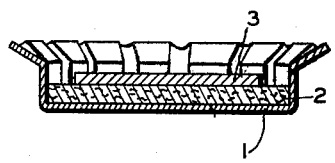
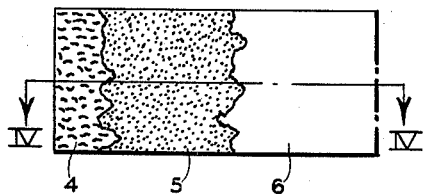
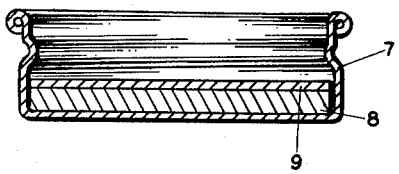
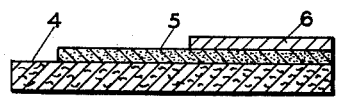
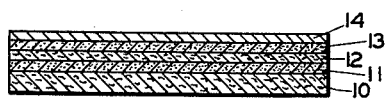
INVENTOR.
Victor A. Navikas Patented June 24, 1952

2,601,318

UNITED STATES PATENT OFFICE 2,601,318

METHOD OF LAMINATING ARTICLES

Victor A. Navikas, Lancaster, Pa., assignor to Armstrong Cork Company, Lancaster, Pa., a corporation of Pennsylvania Application June 11, 1946, Serial No. 676,074

7 Claims. (Cl. 154—139)

This invention relates to a method of joining materials, and more specifically, to a method of joining lamina, at least one of which contains as an essential ingredient thereof a vinylidene chloride polymer or a similar plastic composition in which vinylidene chloride is either a polymer or a copolymer. Other similar materials are formed as copolymerization products of vinylidene chloride and materials copolymerizable therewith, such as styrene and acrylonitrile.

The invention finds particular usefulness in the container closure lining industry where a resilient lining material is used as a backing, and a facing layer is provided which is resistant to attack by the container contents. In certain types of closures the facing material is co-extensive with the resilient backing material; whereas, in others the facing is in the nature of a so-called "spot" and covers only the central portion of the resilient backing. Such spots are frequently used in crowns employed in sealing carbonated beverages, beer, and the like.

The vinylidene chloride products referred to above have been found to be very effective lining materials for closures because of their resistance to a great many chemical compounds, pharmaceutical preparations, liquors, beverages, foods, cosmetic preparations, etc. Such products are not attacked by hydrocarbon solvents and are resistant to acids, water, oils, and alcohols, and are not dissolved by dilute alkali. Most of the products, however, are not sufficiently resilient or yielding to be used as a relatively thick layer to constitute the whole sealing liner and, as a consequence, attempts have heretofore been made to laminate the vinylidene chloride products in thin film or sheet form with useful resilient lining materials such a paper pulp, cork composition, and other customary resilient materials used for closure lining purposes. The vinylidene chloride polymerization products have unusual surface characteristics which make it difficult to satisfactorily and permanently join them to the customary backing materials. All attempts to use the duplexing or laminating cements or adhesives commonly employed in this industry have failed. For example, the use of the protein type adhesives such as glue, casein, gelatin and the like have been tried; all without success.

I have found that in order to satisfactorily bond the vinylidene chloride polymerization product in sheet form to another material such as cork composition or paper pulp backings, it is essential that the facing film or sheet and the adhesive have a limited compatibility which may be determined by a cloud-point method developed by one Paul O. Powers and hereinafter described. The degree of compatibility permissible is relatively limited and is critical. I have found that the adhesive and the vinylidene chloride polymerization product must be miscible to a limited extent but must not be so compatible as to result in undue softening of the vinylidene chloride polymerization product in film or sheet form. There must be limited compatibility in order to obtain a satisfactory key between the adhesive and the surface of the vinylidene chloride polymerization product, but there must not be complete compatibility because of the softening of the film as mentioned above.

I have discovered that vinylidene chloride polymerization products may be duplexed or laminated to other materials with the aid of an emulsion formed of a copolymer of butadiene and styrene, made in the following manner:

About 50 parts by weight of butadiene and about 50 parts by weight of styrene are emulsified and diluted with about 100 parts by weight of water. Polymerization is effected at about 50° C. in the presence of potassium persulfate as a catalyst and in about 12 to 18 hours 95 to 100% conversion of the reactants is effected.

The emulsion polymerization product thus formed has been found to give a highly efficient bond between polyvinylidene chloride in film form and cork composition, pulp board, white sulfite paper and other backing materials customarily used in closure manufacture. The polymerization product to be useful must possess certain physical properties, one of the most important of which is compatibility with the vinylidene chloride polymerization product within a limited range which physical property may be determined in accordance with a cloud point determination which I shall now describe.

According to the Powers cloud-point method of compatibility determination, the vinylidene chloride polymerization product is dissolved in methyl ethyl ketone and the butadiene-styrene polymerization product is dissolved in benzol. Dilute solutions are obtained in the order of 3% to 5% by weight of solids. The two solutions are blended and a film thereof is cast. For most purposes the initial film may contain 5% of the butadiene-styrene copolymerization product and 95% of the vinylidene chloride polymerization product (both exclusive of solvents). If a substantially clear film results at room temperature, upon drying of the cast film, the butadiene-styrene copolymerization product is completely miscible in the vinylidene chloride polymerization product. If an opaque film is obtained, it is evident that the butadiene-styrene copolymerization product and the vinylidene chloride polymerization product are not miscible up to a total of 5% of butadiene-styrene in 95% vinylidene chloride polymerization product. If a slight haze develops in the film it indicates that partial compatibility exists. A second specimen is prepared utilizing 10% of the butadiene-styrene and 90% of the vinylidene chloride polymerization product, and a film is cast. If the cast film so formed is clear it establishes that the facing and the adhesive are compatible up to 10% of the adhesive in the facing. With the specific adhesive described above, a pronounced haze was developed at 10% indicating that 10% was about the limit of compatibility at room temperature, 70° F. If no indication of incompatibility exists at 10%, a further specimen is prepared at 25% butadiene-styrene in the vinylidene chloride polymerization product. An opaque or at least a definitely hazed film should result at 25% or the adhesive will exert too great a softening effect on the vinylidene chloride facing to be useful.

From the work which has been accomplished, I have established that compatibility between the adhesive and the facing must be substantially complete with a minimum of 3% adhesive in the facing, for, otherwise, an unsatisfactory key is likely to result. I have also found that the adhesive must be incompatible in concentrations above about 25% of the adhesive in the facing, for, otherwise, excessive softening will result, particularly in thin films such as those used in the closure art. For best results, I prefer to have the adhesive so formed that it is substantially completely soluble in the facing at 5% and substantially immiscible in concentrations above 10%, for I have found that between such limits the adhesive gives an excellent bond without softening of the facing material.

In order that my invention may be more readily understood, I shall describe the same in conjunction with the attached drawing in which:

Figure 1 is a sectional view of a crown closure, illustrating an article in the manufacture of which the method of my invention may be utilized;

Figure 2 is a top plan view, partially broken away, illustrating a duplexed facing material made in accordance with the method of my invention;

Figure 3 is a sectional view illustrating a screw type closure having a liner and facing assembled in accordance with the method of this invention;

Figure 4 is a sectional view taken in the line IV—IV of Figure 2; and

Figure 5 is a sectional view illustrating in detail a closure liner assembled in accordance with the present invention.

It is understood that the drawings are not to scale and the various layers have been shown in many instances to enlarge size for purposes of clearly illustrating the invention.

In Figure 1 there is shown a closure shell 1 having a sealing liner 2 of cork composition positioned therein. The liner is generally held in place against the metal shell by means of interposed adhesive. A spot 3 is provided and is of a diameter less than the diameter of the liner 2. The spot 3 is secured to the liner 2 by means of an interposed adhesive.

The material for forming the spot 3 is illustrated in Figures 2 and 3 and consists of a backing 4 which may be formed of white sulphite paper or its equivalent. The paper is generally in the order of three thousandths of an inch thick, and is supplied in reels of considerable length. The adhesive 5 made in accordance with the present invention may be the butadiene-styrene copolymerization product described above, being partially and incompletely compatible with the facing material which is indicated at 6 in Figures 2 and 4. The facing layer 6 may be in the nature of a film co-extensive with the sulphite paper layer 4, the film being in the order of two thousandths of an inch to three thousandths of an inch thick. The butadiene-styrene copolymer adhesive is spread over the sulphite paper and the vinylidene chloride copolymer facing layer 6 is pressed into engagement therewith. The laminated web thus formed is fed through a drying chamber where the water in the emulsion is removed and the adhesive is set, bonding the vinylidene chloride copolymerization product 6 to the sulphite paper layer 4.

The duplexed material formed as described above may be utilized to form spots which are adhered to the cork liners of crowns as illustrated in Figure 1, or may be used to face a pulp board closure liner in a screw closure shell 7 as illustrated in Figure 3. In this embodiment the liner may be of pulp board as indicated at 8, and the facing of vinylidene chloride polymerization product laminated to white sulphite paper is indicated at 9 in Figure 3. In the manufacture of crowns, common practice is to cut the spot from a ribbon of the material and adhere it directly to the cork composition, assembled in the crown. In the manufacture of closures such as shown in Figure 3, the facing material of Figure 2 is laminated to the pulp board backing 8 in sheet form, and this is punched into circular discs which are inserted into the closure shells.

In Figure 5, I have illustrated in more detail the assembly of the elements shown in Figures 1 and 3. The backing 10 may be the cork composition 2 of Figure 1, or the pulp board 8 of Figure 3. A layer of adhesive 11 secures the facing to the backing 10, being applied directly to the white sulphite paper supporting layer 12 to which is attached, by means of adhesive 13, the vinylidene chloride copolymer facing material 14. The method of the present invention is directed to the joining of the layers 12 and 14 by the interposed adhesive 13.

While I have referred specifically to an adhesive which is composed of butadiene and styrene of a particular nature having the essential physical characteristic of only partial compatibility with vinylidene chloride polymerization products, if desired, fillers may be incorporated into the adhesive and buffering compounds employed for maintaining the proper pH of the material. Other compounding ingredients may also be incorporated.

While I have illustrated and described certain preferred embodiments of my invention, it will be understood that the same is not limited thereto, but may be otherwise embodied and practiced within the scope of the following claims.

I claim:

1. A method of joining lamina, at least one of which has a surface containing as an essential ingredient thereof a polymerization product selected from the group consisting of polyvinylidene chloride and copolymers of vinylidene chloride and a copolymerizable substance, the steps comprising positioning between said lamina and in engagement with said surface an aqueous emulsion of a copolymer of butadiene and styrene having a cloud-point at 70° F., as herein defined, in said polymerization product between the limits of about 3% and about 25% and drying said emulsion to remove water therefrom, whereby said butadiene-styrene copolymer is dissolved in said polymerization product until at least about 3% but not more than about 25% of said butadiene-styrene copolymer has been taken up and a firm bond is obtained without excessive softening of said polymerization product.

2. A method of joining lamina, at least one of which has a surface containing as an essential ingredient thereof a polymerization product selected from the group consisting of polyvinylidene chloride and copolymers of vinylidene chloride and a copolymerizable substance, the steps comprising positioning between said lamina and in engagement with said surface an aqueous emulsion of a copolymer of butadiene and styrene having a cloud-point at 70° F., as herein defined, in said polymerization product between the limits of about 3% and about 10% and drying said emulsion to remove water therefrom, whereby said butadiene-styrene copolymer is dissolved in said polymerization product until at least about 3% but not more than about 10% of said butadiene-styrene copolymer has been taken up and a firm bond is obtained without excessive softening of said polymerization product.

3. A method of joining lamina, at least one of which contains as an essential ingredient thereof polyvinylidene chloride, the steps comprising positioning between said lamina and in engagement with said polyvinylidene chloride an aqueous emulsion of a copolymer of butadiene and styrene having a cloud-point at 70° F., as herein defined, in said polyvinylidene chloride between the limits of about 3% and about 10% and drying said emulsion to remove water therefrom, whereby said butadiene-styrene copolymer is dissolved in said polyvinylidene chloride until at least about 3% but not more than about 10% of said butadiene-styrene copolymer has been taken up by said polyvinylidene chloride and a firm bond is obtained between said polyvinylidene chloride and the layer joined thereto by said adhesive without excessive softening of said polyvinylidene chloride.

4. A method of joining lamina, at least one of which contains as an essential ingredient thereof a copolymerization product of vinylidene chloride and a substance copolymerizable therewith, the steps comprising positioning between said lamina and in engagement with said copolymerization product an aqueous emulsion of a copolymer of butadiene and styrene which has a cloud-point at 70° F., as herein defined, in said copolymerization product between the limits of about 3% and about 10%, applying pressure to said lamina with the adhesive interposed therebetween, and drying said emulsion to remove water therefrom, whereby said butadiene-styrene copolymer will dissolve in said copolymerization product until at least about 3% but not more than about 10% of said butadiene-styrene copolymer has been taken up and a firm bond obtained without excessive softening of said copolymerization product.

5. A method in accordance with claim 1 in which the limits of compatibility are indicated by a cloud-point between about 5% and about 10%.

6. A method of joining lamina, at least one of which has a surface containing as an essential ingredient thereof polyvinylidene chloride, the steps comprising positioning between said lamina and in engagement with said polyvinylidene chloride an aqueous emulsion of a copolymer of butadiene and styrene containing about 50 parts butadiene to about 50 parts of styrene and having a cloud-point at 70° F., as herein defined, in said polymerization product between the limits of about 3% and about 10% and drying said emulsion to remove water therefrom, whereby said butadiene styrene copolymer will dissolve in said polyvinylidene chloride until at least about 3% but not more than about 10% thereof has been taken up by said polyvinylidene chloride and a firm bond obtained without excessive softening of said polyvinylidene chloride.

7. A method of joining a layer of polyvinylidene chloride to a backing layer comprising interposing between said layers an aqueous emulsion polymerization product of butadiene and styrene which has the physical characteristic of limited compatibility with said polyvinylidene chloride layer defined by a cloud-point at 70° F., as herein defined, between the limits of about 3% and about 10% of the copolymer of butadiene and styrene in the polyvinylidene chloride and drying said emulsion to remove water therefrom.

VICTOR A. NAVIKAS.

REFERENCES CITED

The following references are of record in the file of this patent:

UNITED STATES PATENTS

| Number | Name | Date |
| --- | --- | --- |
| 2,354,855 | Emanuel | Aug. 1, 1944 |
| 2,429,397 | Compton et al. | Oct. 21, 1947 |

OTHER REFERENCES

General-Purpose GR-S Latices, published in "India Rubber World," vol. 109, No. 6, March 1944, pages 577–581 and 584.